United States Patent [19]
Perkins et al.

[11] 3,743,180
[45] July 3, 1973

[54] HEAT EXCHANGER SYSTEM AND METHOD AND PARTS THEREFOR OR THE LIKE

[75] Inventors: Charles H. Perkins, Richmond, Va.; Harold G. Brakebill, Concord, Tenn.; Earl Goff; Edward N. Caldwell, both of Knoxville, Tenn.

[73] Assignee: Robertshaw Controls Company, Richmond, Va.

[22] Filed: Apr. 17, 1972

[21] Appl. No.: 244,756

[52] U.S. Cl. .................. 236/1 C, 236/49, 236/101
[51] Int. Cl. ............................................. F24f 11/04
[58] Field of Search ............... 236/49, 101, 1 C; 98/40 D; 165/16

[56] References Cited
UNITED STATES PATENTS
2,306,557  12/1942  Otto .................................. 236/1 C
2,537,315  1/1951  Newton .............................. 236/1 C Primary Examiner—William E. Wayner
Attorney—Candor, Candor & Tassone

[57] ABSTRACT

A heat exchanger system having a flow path for heat exchanger treated air of one condition thereof to be directed to an area that is to be conditioned by heated air and having damper means therein for controlling the flow of treated air through the flow path in accordance with the temperature of the air in the area being sensed by a temperature sensing unit for controlling the damper means. A control device is provided for causing the temperature sensing unit to sense only the temperature of the treated air in the flow path when the condition of the treated air is reversed from said one condition thereof to another condition thereof whereby the damper means will then be under control of the temperature of the treated air rather than under the control of the temperature of the air in the air being treated thereby.

20 Claims, 7 Drawing Figures

Patented July 3, 1973

HEAT EXCHANGER SYSTEM AND METHOD AND PARTS THEREFOR OR THE LIKE

This invention relates to an improved heat exchanger system and methods for operating the same as well as to an improved single duct variable volume terminal unit for such a system or the like.

It is well known that single duct variable volume terminal units for a heat exchanger system have been provided each for conditioning the air in a room of a building or the like in the south where the only air conditioner normally needed is an air cooling operation and the unit provides more or less 55°F. air to maintain a zone temperature. However, the building may cool down overnight and cause discomfort in the morning because of low temperature until the load of lights, people, etc., warms up the space being treated by the variable volume terminal unit. It is therefore desirable to supply 110° air to the building for a short time in the morning before the building is occupied.

In the past, such single duct variable volume terminal units were each provided with a thermostat which normally operates in the cooling mode with a bulb located in a sampling chamber of the unit that has room air drawn across the bulb by an aspirator being operated by the flow of the treated air through the duct. An increase in bulb temperature caused a bellows to expand and move dampers in the duct toward a more open position thereof to permit more treated air to enter the area and thereby reduce the temperature thereof. Conversely, a decrease in room temperature caused the bellows to move the dampers toward a more closed position thereof to reduce the amount of treated air directed into the room. Thus, on a cold morning when the output of the heat exchanger would be reversed to supply 110° air through the duct to warm the space, the dampers would be at their minimum flow positions requiring a relatively long time period for the heated air to be directed through the duct to heat the room.

However, it has been found according to the teachings of this invention, that such a system could be improved by causing the bulb temperature that controls the dampers to be raised in order to move the dampers to a more open position during the time that the heated air is passing through the duct.

Accordingly, one feature of this invention is to provide means for causing the temperature sensing means of such a single duct variable volume terminal unit to sense the temperature of the treated air flowing through the duct when such treated air is reversed in the condition thereof whereas such temperature sensing means will normally sense the temperature of the air in the area being treated by the duct when the treated air flowing through the duct is in the normal condition thereof.

In particular, one embodiment of this invention provides a heat exchanger system that has a flow path for heat exchanger treated air of one condition thereof to be directed to an area to be conditioned by the treated air and has damper means for controlling the flow of treated air through the flow path in accordance with the temperature of the air in the area as sensed by a temperature sensing means for controlling the damper means. A control means is provided for causing the temperature sensing means to sense only the temperature of the treated air in the flow path when the heat exchanger treated air is reversed from one condition thereof to another condition thereof whereby the damper means will then be under the control of the temperature of the treated air rather than under the control of the temperature of the air in the area. Thus, the one condition of the treated air can be when the heat exchanger is cooling the air and the other condition of the treated air can be when the heat exchanger is heating the air such as for initially warming up the area after a relatively cool night, for the reasons previously set forth.

Accordingly, it is an object of this invention to provide an improved heat exchanger system having one or more of the novel features set forth above or hereinafter shown or described.

Another object of this invention is to provide an improved method for operating such a heat exchanger system or the like.

Another object of this invention is to provide an improved single duct variable volume terminal unit for use with such a heat exchanger system or the like.

Other objects, uses and advantages of this invention are apparent from a reading of the description which proceeds with reference to the accompanying drawings forming a part thereof and wherein.

Figure 1:
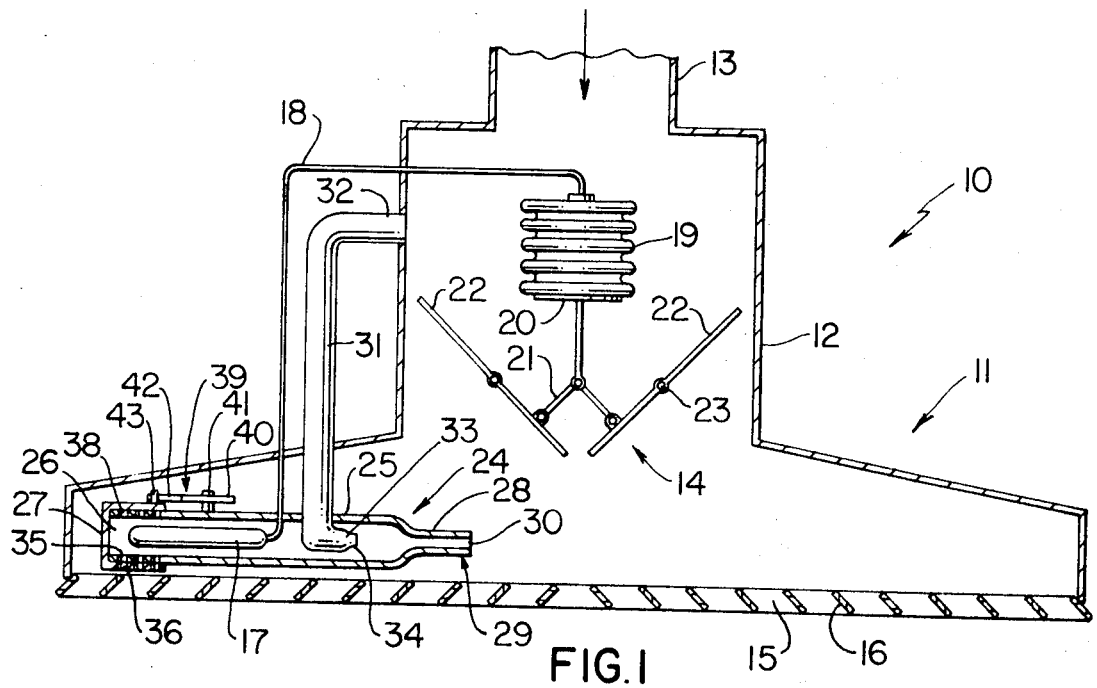
FIG. 1 is a schematic view, partially in cross section, illustrating the improved heat exchanger system, method, and terminal unit of this invention in one of the operating positions thereof.

While the various features of this invention are hereinafter described and illustrated as being particularly adapted to provide a single duct variable volume terminal unit for a heat exchanger system, it is to be understood that the various features of this invention can be utilized singly or in any combination thereof to provide devices for other types of heat exchanger systems as desired.

Therefore, this invention is not to be limited to only the embodiments illustrated in the drawings, because the drawings are merely utilized to illustrate one of the wide variety of uses of this invention.

Figure 2:
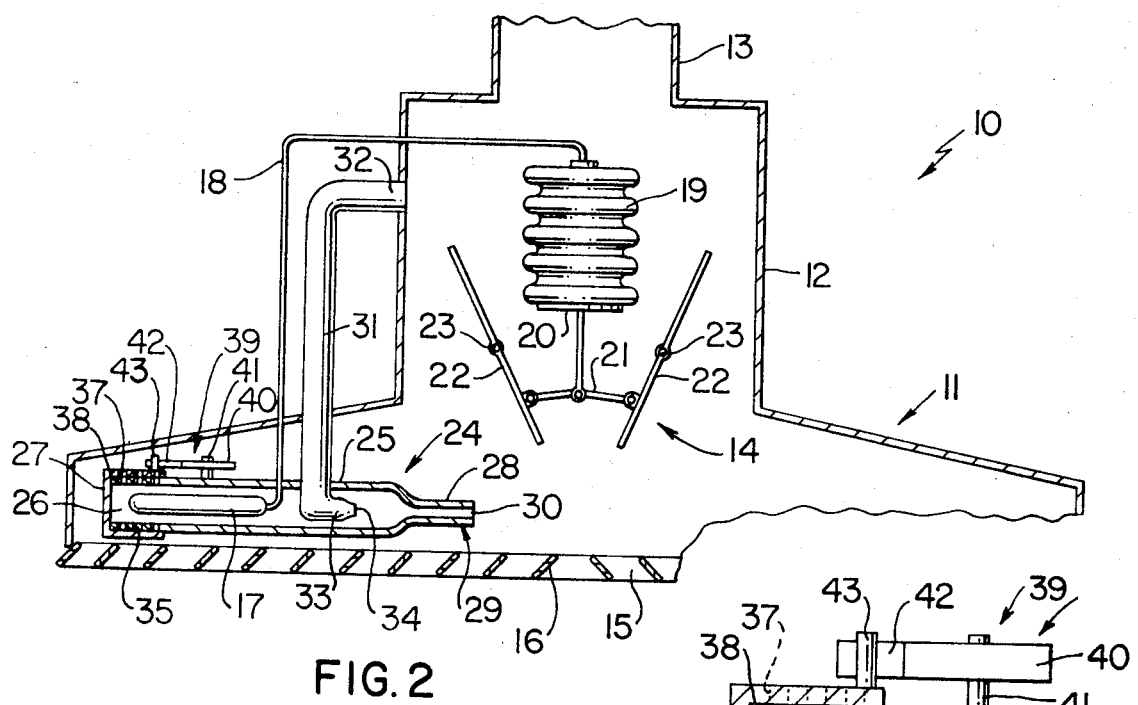
FIG. 2 is a view similar to FIG. 1 and illustrates the unit in another operating position thereof.
Figure 3:
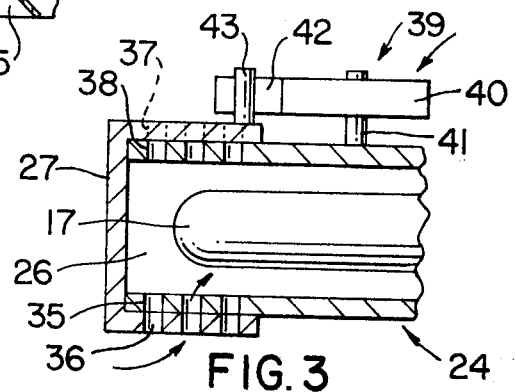
FIG. 3 is an enlarged, fragmentary, cross-sectional view of the air sampling chamber of the terminal unit of FIG. 1.

Referring now to FIGS. 1, 2 and 3, an improved heat exchanger system of this invention is generally indicated by the reference numeral 10 and comprises a single duct variable volume terminal unit 11 having a duct 12 for receiving heat exchanger treated air in the upstream portion 13 thereof to be directed past internal damper means 14 and out through an outlet 15 of the unit 12 into an area being treated by said unit 11, such as a room of a building or the like which has a central heat exchanger (not shown) for directing treated air to such terminal units 11 disposed throughout the rooms or the building in a manner well known in the art. If desired, the outlet 15 can be provided with adjustable louvres or vanes 16 for directing the flow path of the treated air as the same passes out of the outlet 15.

As previously stated, the dampers 14 are normally controlled by a temperature sensing bulb 17 which is responsive to the temperature of the area being treated by the unit 11 in a manner hereinafter described so that as the temperature of the area increases, the fluid in the bulb 17 expands and, thus, is forced through the capillary tube 18 to an expandable and contractible bellows construction 19 which will have its movable wall 20 moved downwardly as the bellows 19 correspondingly expands and through suitable linkages 21 will cause the damper vanes 22 to pivot on their pivots 23 to move to a more open position so that a greater amount of the treated air will pass out of the outlet 15 of the duct 12 into the area to tend to reduce the temperature of the area since the treated air is normally being maintained at a cooling temperature by the heat exchanger. Conversely, when the area being treated by the unit 11 has the temperature thereof decreased, the temperature sensing bulb 17 will have the fluid therein contract and thereby cause the bellows 19 to collapse so that the movable wall 20 thereof will move upwardly and pivot the damper vanes 22 to a more closed position thereof to decrease the amount of treated air flowing through the duct 12 to pass out of the outlet 15. Thus, it can be seen that during the cooling cycle for the terminal unit 11 the damper vanes 22 are controlled in response to the temperature of the area being treated by the treated air being directed thereto by the terminal unit 11.

In order for the temperature sensing bulb 17 to sense the temperature of the air in the area being treated by the unit 11, the bulb 17 is disposed in an aspirator means 24 comprising a tubular member 25 having one end 26 closed by a cupshaped cap 27 for a purpose hereinafter described and the other end 28 thereof necked down to form an aspirator nozzle 29 having its outlet 30 directed into the interior of the duct 12. A conduit 31 has one end 32 thereof located in fluid communication with the duct 12 upstream of the damper means 14 and has its other end 33 disposed within the tubular member 25 and formed in nozzle fashion so as to have its outlet 34 directed toward the aspirator nozzle 29 whereby the flow of treated air in the duct 12 will have a portion thereof pass down through the conduit 31 and directed back into the duct 12 through the outlet 30 of the aspirator tube 25 so that such flow of fluid through the aspirator nozzle 29 tends to draw fluid into the aspirator tube 25 at a point to the left of the nozzle 29 in a manner well known in the aspirator art.

The left-hand end of the tube 25 is provided with a plurality of openings 35 in the bottom of the tube 25 which are adapted to be alignable with like openings 36 in the closure cap 27 when the closure cap 27 is in the position illustrated in FIGS. 1 and 3 so that as the aspirator nozzle 29 is operating in the manner previously described by the flow of treated air through the duct 12, the aspirator tube 25 draws room air up through the outlet 15 and through the aligned passages 36 and 35 into the tube 25 because such aspirator tube 25 has the openings 35 and 36 located closely adjacent the outlet 15. In fact, the tube 25 could have the portion containing the openings 36 and 35 so located that the same would be disposed outside of the outlet 15 and in the room, if desired.

In any event, it can be seen that room air will be drawn across the temperature sensing bulb 17 continuously by the operating aspirator nozzle 29 so that the temperature of the room air being treated by the treated air of the terminal unit 11 is continuously controlling the position of the dampers 14 so as to tend to maintain the temperature in the area being treated by the unit 11 at the desired temperature value thereof.

However, in order to have the temperature sensing bulb 17 be responsive to the temperature of the treated air in the duct 12 when the same is reversed from the cooling cycle thereof to the heating cycle thereof for initially warming up a cooled room, such as in the morning before the office workers arrive, or the like, and so that the damper vanes 22 will be moved to their fully opened position as illustrated in FIG. 2 to permit a rapid flow of heated air through the terminal unit 11, the cap 27 is automatically rotated about the longitudinal axis of the aspirator tube 25 so as to cause other openings 37 therein to align with openings 38 in the top of the left-hand end of the aspirator tube 25 with such aligned openings 37 and 38 being positioned for permitting the treated air in the duct 12 to be drawn into the aspirator tube 25 by the operating aspirator nozzle 29, the cap 27 when in the position of FIG. 2 closing off the openings 35 in the lower portion of the tube 25 so that no room air will be drawn into the aspirator tube 25 at this time. Conversely, when the cap 27 is in the position of FIGS. 1 and 3, the top openings 38 are closed by the cap 27.

In order to move the cap 27 from the position illustrated in FIGS. 1 and 3 to the position illustrated in FIG. 2 upon the treated air in the chamber 12 being changed to the other condition thereof, which in the example given is when the treated air is being heated by the heat exchange for the system 10, and then to return the cap 27 back to the position illustrated in FIGS. 1 and 3 when the treated air is subsequently being cooled by the heat exchanger of the system 10, a temperature sensing device 39 is provided which senses the temperature of the treated air in the duct 12 so that when the same senses that the treated air in the duct 12 is cooled air, the same will automatically position the cap 27 in the position illustrated in FIGS. 1 and 3 and when the device 39 senses that the treated air in the duct 12 is now being heated, the same will automatically move the cap 27 to the position illustrated in FIG. 2.

For example, such temperature sensing device 39 can comprise a coiled bimetal ribbon 40 having its inner end (not shown) interconnected to a post 41 carried by the tubular member 25 and having its outer end 42 passing through a slot in a post member 43 carried by the cap 27 so that back and forth movement of the movable end 42 of the bimetal ribbon 40 in response to temperature sensing changes will cause the cap 27 to slightly rotate about the longitudinal axis of the aspirator tube 25 between the positions illustrated in FIGS. 1 and 2. Thus, when the bimetal member 40 is being heated by the heated air in the duct 12, the same is warped to a position to cause the cap 27 to have its upper openings 37 aligned with the upper openings 38 of the aspirator tube 25 so that the temperature sensing bulb 17 therein will only sense the treated air flowing through the duct 12 as the aspirator nozzle 29 is operating whereas when the bimetal ribbon 40 is sensing cooled air in the duct 12, the same has caused the cap 27 to rotate to the position illustrated in FIGS. 1 and 3 where the upper openings 38 of the tube 25 are closed and the lower openings 36 in the cap 27 are aligned with the lower openings 35 in the tube 25 so that only room air is drawn across the temperature sensing bulb 17 by the operating aspirator nozzle 29.

Therefore, it can be seen that the terminal unit 11 of the heat exchanger system 10 of this invention provides automatic control means for controlling the dampers 14 in response to the air of the area being treated by the terminal unit 11 during the normal operation of the heat exchanger for the system 10 and which will place the temperature sensing bulb 17 under control of the temperature of the treated air in the duct 12 only when the condition of the treated air has been reversed from the normal condition thereof, such as when the treated air is being heated for a rapid heating up of the room containing the terminal unit 11.

In particular, when the heated air passes across the bulb 17 when the cap 27 is in the position illustrated in FIG. 2, the expansion of the fluid in the bulb 17 causes the bellows 19 to fully expand to a position to hold the damper vanes 22 in their fully opened position so that a full flow of heated air will pass into the room to rapidly heat the same.

Figure 4:
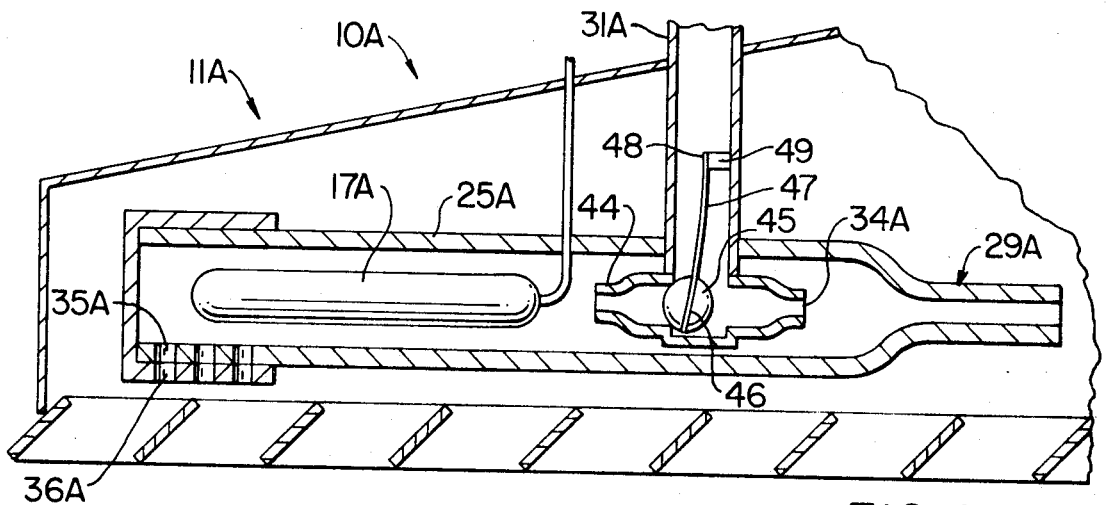
FIG. 4 is a view similar to FIG. 1 and illustrates another embodiment of this invention.

Reference is now made to FIG. 4 wherein another terminal unit of this invention is generally indicated by the reference numeral 11A and parts thereof similar to the unit 11 previously described are indicated by like reference numerals followed by the reference letter A.

As illustrated in FIG. 4, the terminal unit 11A is formed in substantially the same manner as the terminal unit 11 previously described except that the tube 31A that supplies the treated air out through the outlet 34A thereof for operating the nozzle 29A of the aspirator tube 25A also has another nozzle end 44 directed oppositely from the nozzle end 34A thereof for a purpose now to be described and the cap 27A is not to be rotated from the position illustrated.

A movable valve member 45 is disposed in the tube 31A and is carried on the free end 46 of a bimetal member 47 having its other end 48 secured to the tube 31A by a spacer 49 so that the bimetal member 47 senses the temperature of the treated air passing through the tube 31A to the aspirator tube 25A. When the temperature of the treated air of the tube 31A is at a cooling temperature, the bimetal member 47 maintains the valve member 45 to the left as illustrated in FIG. 4 to close off the nozzle element 44 or open the nozzle element 34A so that all of the air flow through the tube 31A passes out of the nozzle element 34A to operate the aspirator tube 29A in a manner to draw room air through the aligned openings 36A and 35A in the manner previously described whereby the temperature sensing bulb 17A will be sensing room temperature for operating the damper means of the terminal unit 11A in the manner previously described.

However, when the heat exchanger is directing heated air to the terminal unit 11A, the heated air passes down through the tube 31A and heats the bimetal member 47 to cause the same to warp to the right in FIG. 4 whereby the valve member 45 closes the outlet nozzle 34A while opening the nozzle 44 so that heated air is now directed across the temperature sensing bulb 17A and passes out of the tube 25A through the aligned openings 35A and 36A so that the temperature sensing bulb 17A is now only sensing the treated air of the unit 11A. In this manner, the heated temperature sensing bulb 17A will cause the damper vanes for the terminal unit 11A to move to their fully opened position whereby the heated air can rapidly heat up the room containing the terminal unit 11A in the manner previously described.

Thereafter, when the heat exchanger for the system 10A is reversed back to its cooling cycle, the cooled air now passing down through the tube 31A cools the bimetal member 47 to cause the same to warp back to the position illustrated in FIG. 4 so that the nozzle 44 is closed and the nozzle 34A is open to cause the aspirator 29A to begin to operate and thereby draw room air through the aligned openings 36A and 35A and, thus, across the temperature sensing bulb 17A so that the same is now responsive only to the room air temperature and not the temperature of the treated air in the terminal unit 11A. In this manner, the temperature sensing bulb 17A will now operate the dampers of the unit 11A in accordance with room temperature for the reasons previously set forth.

Figure 5:
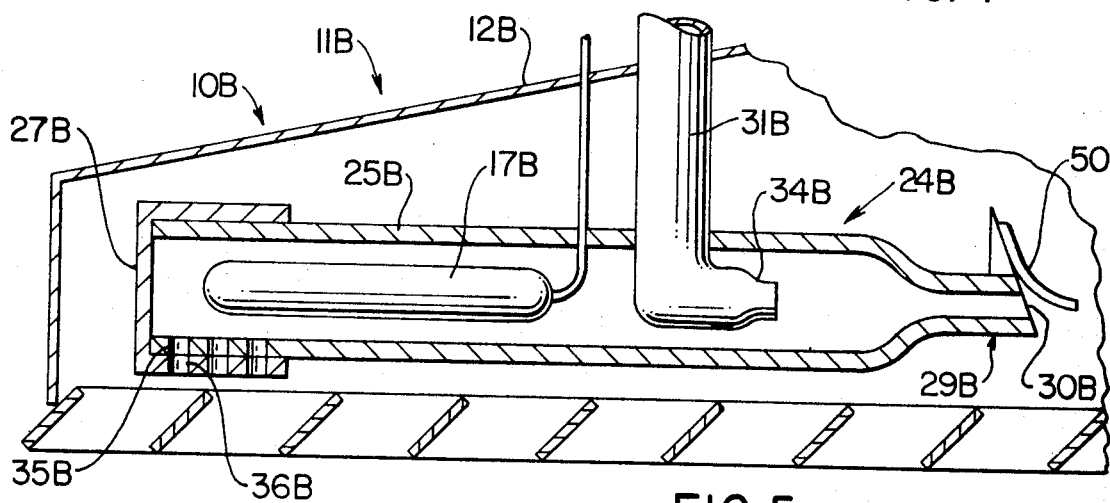
FIG. 5 is a view similar to FIG. 4 and illustrates another embodiment of this invention.

Another terminal unit of this invention is generally indicated by the reference numeral 11B in FIG. 5 and parts thereof similar to the unit 11 and 11A previously described will be indicated by like reference numerals followed by reference letter B.

As illustrated in FIG. 5, the aspirator means 24B appears to be substantially the same as the aspirator means 24 of the unit 11 of FIG. 1 except that no means are provided for adjusting the cap 27B thereof as the cap 27B will always remain in the position illustrated in FIG. 5 where the openings 36B in the cap 27B are aligned with the lower openings 35B of the aspirator tube 25B.

However, a bimetal member 50 is carried by the aspirator tube 25B at the nozzle end 29B thereof so that the bimetal member 50 is adapted to open and close the opening 30B of the nozzle 29B depending upon the position of the bimetal member 50. Because the bimetal member 50 is disposed outside the aspirator tube 25B and in the duct 12B, the same senses the temperature of the treated air passing through the terminal unit 11B so that when the temperature of the air is at a cooling temperature, the bimetal member 50 is in the condition illustrated in FIG. 5 to fully open the end 30B of the nozzle 29B whereby the aspirator means 24B can operate in the normal manner to draw room air through the aligned openings 36B and 35B so as to pass across the temperature bulb 17B to operate the dampers of the unit 11B in accordance with the temperature of the room being treated by the treated air of the terminal unit 11B. However, when the heat exchanger for the heat exchanger system 10B is producing heated air for the terminal unit 11B, the heated air heats the bimetal member 50 to cause the same to warp and close the opening 30B so that no more air can pass out through the aspirator nozzle 29B and the heated air now passing out of the end 34B of the conduit 31B is directed by the closed nozzle 29B back across the temperature sensing bulb 17B and out through the aligned openings 35B and 36B so that the temperature sensing bulb 17B is now responsive only to the temperature of the treated air of the unit 11B to fully open the dampers thereof for the reasons previously set forth.

Figure 6:
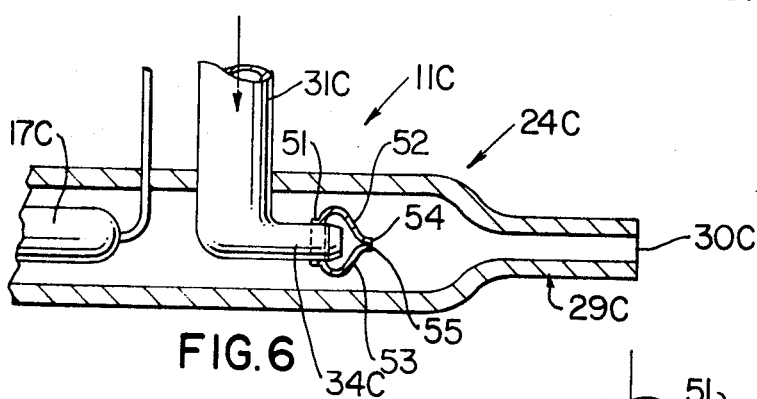
FIG. 6 is a view similar to FIG. 5 and illustrates another embodiment of this invention.
Figure 7:
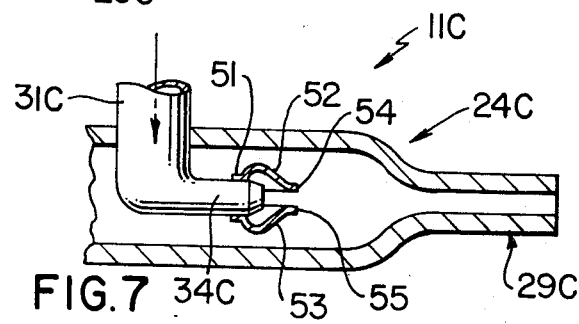
FIG. 7 is a view similar to FIG. 6 and illustrates the unit of FIG. 6 in another operating position thereof.

Another terminal unit of this invention is generally indicated by the reference numeral 11C in FIGS. 6 and 7 and parts thereof similar to the terminal units 11, 11A and 11B previously described will be indicated by like reference numerals followed by the reference letter C.

As illustrated in FIGS. 6 and 7, the aspirator means 24C of the unit 11C is substantially identical to the aspirator means 24B of FIG. 5 except that the bimetal member 50 is no longer provided for opening and closing the opening 30C thereof, which will always remain in the open position.

However, a bimetal device 51 is carried on the outlet end 34C of the tube 31C so as to be responsive to the temperature of the treated air passing through the conduit 31C to the aspirator nozzle 29C. The bimetal member 51 is so constructed and arranged that the same has two flaps 52 and 53 respectively provided with three free ends 54 and 55 which will move together in the manner illustrated in FIG. 6 when heated so as to provide a deflector across the outlet end 34C of the tube 31C to direct the air passing out of the same away from the nozzle 29C and toward the temperature sensing bulb 17C to heat the bulb 17C and thereby cause the bulb 17C to be responsive to the treated air passing through the terminal unit 11C for maintaining the dampers thereof in their fully opened position for the reasons previously set forth. However, when cooled air is passing through the conduit 31C, the same causes the bimetal flaps 52 and 53 to cool and thereby warp to the open positions illustrated in FIG. 7 so that the treated air passing through the conduit 31C will be directed to the nozzle 29C of the aspirator means 24C and cause the same to operate and draw room air across the temperature sensing bulb 17C for the reasons previously set forth.

Therefore, it can be seen that this invention not only provides an improved heat exchanger system and method of operating the same, but also this invention provides an improved single duct variable volume terminal unit for use in such a system or the like.

While the forms of the invention now preferred have been described as required by the patent statutes, other forms may be utilized, all coming within the scope of the appended claims.

What is claimed is:

1. In a heat exchanger system having a flow path for heat exchanger treated air of one condition thereof to be directed to an area to be conditioned by said treated air and containing damper means for controlling the flow of treated air through said flow path in accordance with the temperature of the air in aid area sensed by a temperature sensing means for controlling said damper means, the improvement comprising control means for causing said temperature sensing means to sense only the temperature of said treated air in said flow path when said heat exchanger treated air is reversed from said one condition thereof to another condition thereof whereby said damper means will then be under the control of the temperature of said treated air rather than under the control of the temperature of the air in said area.

2. In a heat exchanger system as set forth in claim 1, the further improvement wherein said one condition of said treated air is when said heat exchanger is cooling said air whereas said other condition of said treated air is when said heat exchanger is heating said air.

3. In a heat exchanger system as set forth in claim 1, the further improvement wherein said control means also causes said temperature sensing means to sense only the temperature of the air in said area when said treated air in said flow path is in said one condition thereof.

4. In a heat exchanger system as set forth in claim 1, the further improvement wherein an aspirator means is adapted to be operated by the flow of treated air through said flow path to draw the air of said area across said temperature sensing means, said control means causing said flow of treated air to operate said aspirator means when said treated air is in said one condition thereof and causing said aspirator means to terminate its area air drawing operation when said treated air is in said other condition thereof.

5. In a heat exchanger system as set forth in claim 4, the further improvement wherein said control means comprises a temperature sensing device and is so constructed and arranged that the same senses the temperature of said treated air in said flow path.

6. In a heat exchanger system as set forth in claim 5, the further improvement wherein said control means causes said aspirator means to operate in a manner to draw air from said flow path across said temperature sensing means when said control means senses that said treated air in said flow path is in said other condition thereof.

7. In a heat exchanger system as set forth in claim 5, the further improvement wherein said control means comprises a movable valve member that is adapted to be in one position for directing some of the treated air from said flow path to a nozzle of said aspirator means to operate said aspirator means when said control means senses that said treated air is in said one condition thereof and that is adapted to be in another position thereof for directing said some of the treated air away from said nozzle and toward said temperature sensing means when said control means senses that said treated air is in said other condition thereof.

8. In a heat exchanger system as set forth in claim 5, the further improvement wherein said aspirator means comprises a nozzle that is adapted to have some of the treated air from said flow path flow therethrough to operate said aspirator means, said control means comprising a valve member for opening and closing said nozzle, said valve member opening said nozzle when sensing that said treated air is in said one condition thereof and closing said nozzle when sensing that said treated air is in said other condition thereof.

9. In a single duct variable volume terminal unit having a flow path for heat exchanger treated air of one condition thereof to be directed out of an outlet of said unit to a room to be conditioned by said treated air and containing damper means for controlling the flow of treated air through said flow path in accordance with the temperature of the air in said room sensed by a temperature sensing means for controlling said damper means, the improvement comprising control means carried by said unit and adapted to cause said temperature sensing means to sense only the temperature of said treated air in said flow path when said heat exchanger treated air is reversed from said one condition thereof to another condition thereof whereby said damper means will then be under the control of the temperature of said treated air rather than under the control of the temperature of the air in said room.

10. In a unit as set forth in claim 9, the further improvement wherein said one condition of said treated air is when said air is cooling said room whereas said other condition of said treated air is when said air is heating said room.

11. In a unit as set forth in claim 9, the further improvement wherein said control means also is adapted to cause said temperature sensing means to sense only the temperature of the air in said room when said treated air in said flow path is in said one condition thereof.

12. In a unit as set forth in claim 9, the further improvement wherein an aspirator means is carried by said unit and is adapted to be operated by the flow of treated air through said flow path to draw the air of said room across said temperature sensing means, said control means being adapted to cause said flow of treated air to operate said aspirator means when said treated air is in said one condition thereof and being adapted to cause said aspirator means to terminate its room air drawing operation when said treated air is in said other condition thereof.

13. In a unit as set forth in claim 12, the further improvement wherein said control means comprises a temperature sensing device and is so constructed and arranged that the same is adapted to sense the temperature of said treated air in said flow path.

14. In a unit as set forth in claim 13, the further improvement wherein said control means is adapted to cause said aspirator means to operate in a manner to draw air from said flow path across said temperature sensing means when said control means senses that said treated air in said flow path is in said other condition thereof.

15. In a unit as set forth in claim 13, the further improvement wherein said control means comprises a movable valve member that is adapted to be in one position for directing some of the treated air from said flow path to a nozzle of said aspirator means to operate said aspirator means when said control means senses that said treated air is in said one condition thereof and that is adapted to be in another position thereof for directing said some of the treated air away from said nozzle and toward said temperature sensing means when said control means senses that said treated air is in said other condition thereof.

16. In a unit as set forth in claim 13, the further improvement wherein said aspirator means comprises a nozzle that is adapted to have some of the treated air from said flow path flow therethrough to operate said aspirator means, said control means comprising a valve member for opening and closing said nozzle, said valve member being adapted to open said nozzle when sensing that said treated air is in said one condition thereof and being adapted to close said nozzle when sensing that said treated air is in said other condition thereof.

17. In a method for controlling a heat exchanger system having a flow path for heat exchanger treated air of one condition thereof to be directed to an area to be conditioned by said treated air and containing damper means for controlling the flow of treated air through said flow path in accordance with the temperature of the air in said area sensed by a temperature sensing means for controlling said damper means, the improvement comprising the step of causing said temperature sensing means to sense only the temperature of said treated air in said flow path when said heat exchanger treated air is reversed from said one condition thereof to another condition thereof whereby said damper means will then be under the control of the temperature of said treated air rather than under the control of the temperature of the air in said area.

18. In a method as set forth in claim 17, the further improvement wherein said one condition of said treated air is when said heat exchanger is cooling said air whereas said other condition of said treated air is when said heat exchanger is heating said air.

19. In a method as set forth in claim 17, the further improvement of causing said temperature sensing means to sense only the temperature of the air in said area when said treated air in said flow path is in said one condition thereof.

20. In a method as set forth in claim 17, the further improvement of providing an aspirator means that is adapted to be operated by the flow of treated air through said flow path to draw the air of said area across said temperature sensing means, and causing said flow of treated air to operate said aspirator means when said treated air is in said one condition thereof and causing said aspirator means to terminate its area air drawing operation when said treated air is in said other condition thereof.

* * * * *